United States Patent
Perlow

(10) Patent No.: US 6,810,090 B1
(45) Date of Patent: Oct. 26, 2004

(54) DIRECT DIGITAL VESTIGIAL SIDEBAND (VSB) MODULATOR

(75) Inventor: Randall Bret Perlow, Aliso Viejo, CA (US)

(73) Assignee: Sarnoff Corporation, Princeton, NJ (US)

( * ) Notice: Subject to any disclaimer, the term of this patent is extended or adjusted under 35 U.S.C. 154(b) by 0 days.

(21) Appl. No.: 09/504,097

(22) Filed: Feb. 15, 2000

Related U.S. Application Data

(60) Provisional application No. 60/120,569, filed on Feb. 18, 1999.

(51) Int. Cl.[7] ............................. H03C 1/52; H04L 27/04
(52) U.S. Cl. ....................................... 375/301; 375/295
(58) Field of Search ................................. 375/295, 301, 375/247, 219, 240.01, 316; 370/344; 348/607, 608; 380/276; 332/170, 103; 342/169; 702/75; 455/127

(56) References Cited

U.S. PATENT DOCUMENTS

| | | | |
|---|---|---|---|
| 4,974,236 A | | 11/1990 | Gurcan et al. |
| 5,412,352 A | | 5/1995 | Graham |
| 5,508,752 A | * | 4/1996 | Kim et al. ................... 348/608 |
| 5,512,957 A | | 4/1996 | Hulyalkar |
| 5,764,701 A | | 6/1998 | Horwitz ..................... 375/301 |
| 5,801,595 A | | 9/1998 | Davis et al. |
| 5,852,630 A | * | 12/1998 | Langberg et al. ........... 375/219 |
| 5,949,878 A | * | 9/1999 | Burdge et al. .............. 380/276 |
| 6,215,828 B1 | * | 4/2001 | Signell et al. .............. 375/316 |
| 6,339,621 B1 | * | 1/2002 | Cojocaru et al. ........... 375/247 |
| 6,381,265 B1 | * | 4/2002 | Hessel et al. ............... 375/219 |

* cited by examiner

Primary Examiner—Stephen Chin
Assistant Examiner—Curtis Odom
(74) Attorney, Agent, or Firm—William J. Burke, Esq.

(57) ABSTRACT

A method and apparatus for providing direct conversion of baseband digital symbols to a desired frequency (e.g., IF or RF) without the need for analog up conversion. The apparatus of the present invention is a VSB modulator comprising a complex frequency shifter, an interpolation filter, an optional pilot inserter, a DDS quadrature modulator and an optional image rejector and DAC compensator. The architecture of the present VSB modulator can be implemented using digital integrated circuit technologies, thereby significantly reducing the cost of devices that require a VSB modulator.

20 Claims, 3 Drawing Sheets

DIRECT DIGITAL VESTIGIAL SIDEBAND (VSB) MODULATOR

This application claims the benefit of U.S. Provisional Application No. 60/120,569 filed on Feb. 18, 1999, which is herein incorporated by reference.

The invention relates to a method and apparatus for modulating a vestigial sideband (VSB) signal.

BACKGROUND OF THE DISCLOSURE

With the ever increasing proliferation of digital information, various standards have been established to outline the format for implementing the transmission of such digital information. For example, digital data may be transmitted as a sub-carrier in the lower vestigial sideband (VSB) spectral region of a standard television signal, e.g., a National Television Standards Committee (NTSC) broadcast video signal.

Specifically, "8-VSB" and "16-VSB" are two radio frequency (RF) modulation formats that are utilized by the digital television standard (e.g., Advanced Television Systems Committee (ATSC)) to transmit digital information terrestrially or via a cable environment to consumers respectively. An ATSC compliant transmitter will typically receive and modulate an encoded bitstream, e.g., an MPEG compliant bitstream, onto a RF channel and transmit the modulated signal to the consumers. With such wide acceptance of this digital technology, it is advantageous to obtain a transmitter having a low-cost digital VSB modulator that can be employed for high-definition television (HDTV) applications including remodulation of digital video directly to a typical television intermediate frequency (IF) or RF frequency.

Therefore, there is a need in the art for an apparatus and method for direct conversion of baseband digital symbols to a desired frequency (e.g., IF or RF) without the need for analog up conversion.

SUMMARY OF THE INVENTION

The invention is a method and apparatus for providing direct conversion of baseband digital symbols to a desired frequency (e.g., IF or RF) without the need for analog up conversion.

Specifically, the apparatus of the present invention is a VSB modulator comprising a complex frequency shifter, an interpolation filter, an optional pilot inserter, a DDS quadrature modulator and an optional image rejector and DAC compensator.

The input to the complex frequency shifter can be an ATSC bitstream having undergone FEC processing. At the input of the VSB modulator, the symbols are frequency shifted to generate a complex signal and then decimated to provide two half-rate streams.

The frequency-shifted signal is then received by the interpolation filter, where the filter is a polyphase 16:1 interpolation filter having real coefficients. Namely, interpolation filter is a baseband interpolation filter. The polyphase 16:1 interpolation filter effectively generates 16 output symbols for every input symbol.

The pilot inserter adds a complex pilot signal at −2.69 MHz to the output of the interpolation filter. The pilot signal is a small DC shift that is applied as a helping signal. Namely, after frequency shaping the spectrum, the pilot signal is inserted at the left band edge. By performing pilot insertion after (rather than before) the interpolation filter, the datapath through the interpolation filter is maintained at 3 bits (rather than 16) so that the filter size is reduced. This is another advantage in reducing the overall cost of the modulator.

After pilot insertion, the data signal (a complex baseband signal) is applied to a quadrature modulator 240 that makes use of direct digital synthesizers (DDS) operating at 86.08 MHz. Two synthesizers are used to generate two real sinusoids that are 90 degrees out of phase from one another. Each of these sinusoids is multiplied by one of the input streams. Namely, the complex baseband signal to the quadrature modulator is digitally modulated up to some desired frequency, (e.g., intermediate frequency (IF) or RF). The desired frequency is selected within the DDS.

After multiplication, the two streams are multiplexed together to form a 176.16 MHz. output stream which contains the desired digital signal as well as images due to the synthesizer aliases. This stream is then applied to the image rejector and DAC compensator 250, which is tasked with performing image rejection and compensation for spectral rolloff in digital-to-analog converters.

Thus, the present invention provides an apparatus and method for providing direct conversion of baseband digital symbols to a desired frequency (e.g., IF or RF) without the need for analog up conversion. Additionally, the architecture of the present VSB modulator can be implemented using digital integrated circuit technologies, thereby significantly reducing the cost of devices that require a VSB modulator.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

The invention will be described within the context of an ATSC television system. It will be apparent to one of ordinary skill in the art that the invention is also applicable to PAL and SECAM systems.

Figure 1:
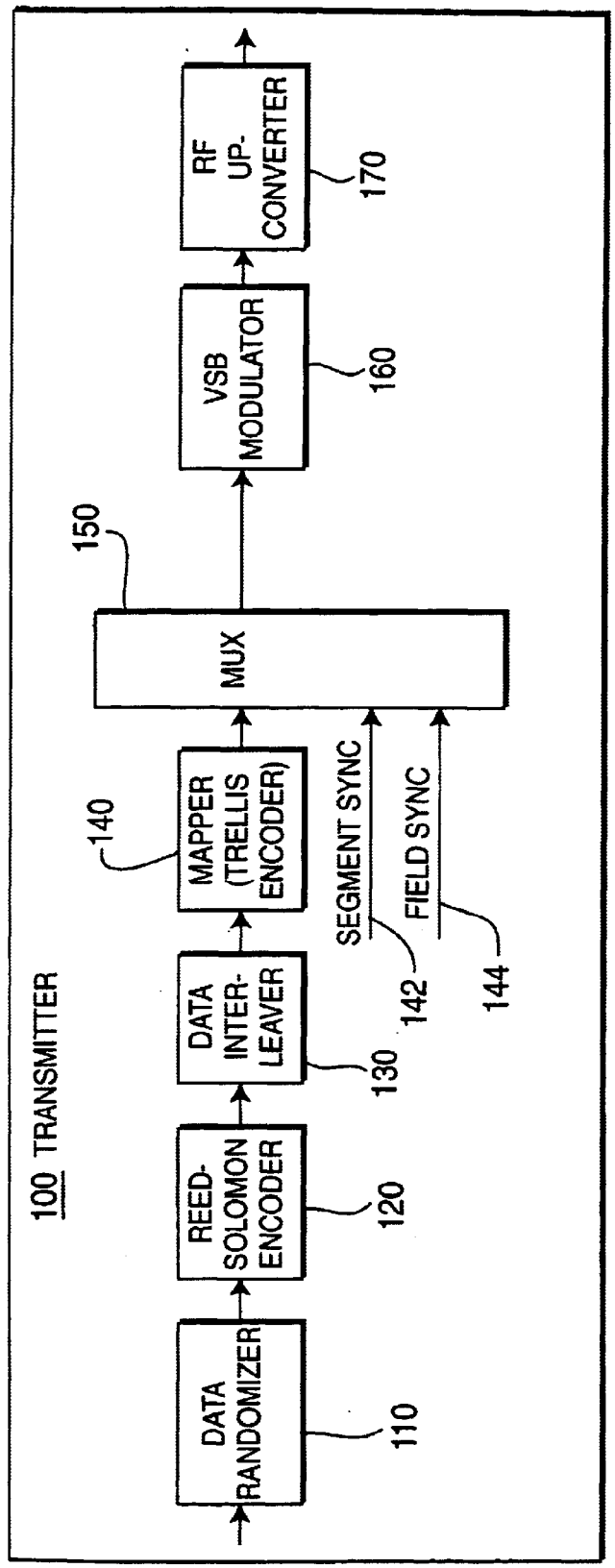
FIG. 1 depicts a block diagram of a transmitter embodying the modulator of the present invention for direct conversion of baseband digital symbols to IF or RF without the need for analog up conversion.

FIG. 1 depicts a block diagram of a transmitter 100 embodying the modulator of the present invention for direct conversion of baseband digital symbols to IF or RF without the need for analog up conversion. The transmitter 100 comprises a data randomizer 110, an encoder (e.g., Reed-Solomon encoder) 120, a data interleaver 130, an encoder (e.g., Trellis encoder) or a mapper 140, a multiplexer 150, a VSB modulator 160 and an RF up-converter 170.

The data randomizer 110 is tasked with randomizing the incoming data payload only, e.g., MPEG transport packets. Segment and Field Syncs are not randomized by the data randomizer 110. The randomization process is implemented to minimize concentration of RF energy at certain modulating frequency. Specifically, it is desirable to have the output VSB signal be as random as possible. The randomness ensures the transmitted signal frequency response will have a flat noise-like spectrum, thereby ensuring that the allotted channel space is used with maximum efficiency. Namely, if the data contains repetitious information, the recurring patterns may cause the RF energy content of the transmitted signal to congregate at certain discrete points in the frequency spectrum, thereby leaving voids at other frequencies. This scenario may create the undesirable condition of having the 6 MHz channel be overused in some parts and underused in other parts. The randomization pattern is a known pattern, such that the receiver can apply the reverse process to recover the proper data values. The present invention is not limited to a particular randomization process.

The encoder 120 is typically a block encoder, e.g., Reed-Solomon encoder, for applying a forward error correction (FEC) process to the incoming data signal. FEC processes are error correction schemes that are designed to correct bit errors that may occur during transmission, e.g., noise, multipath propagation, transmitter non-linearities, and signal fades. The present invention is not limited to a particular FEC process.

The data interleaver 130 is employed to scramble the sequential order of the data stream and to disperse the data packets throughout time, e.g., over a period of time such as several milliseconds. The purpose of the data interleaver 130 is to disperse the data packets in order to minimize the transmitted signal's vulnerability to burst type interference Namely, the data interleaver 130 assembles tiny fragments of scrambled data packets into new data packets, where the reconstituted data packets have the same length as the original data packets. Thus, a brief noise burst will only cause the loss of some of the data in the stream for any given period of time. ATSC defines the data interleaver employed In the VSB transmission system to be a 52 data segment (intersegment) convolutional byte Interleaver and having a depth of approximately ⅙ of a data field (4 ms. deep). Again, the interleaving pattern is a known pattern, such that the receiver can apply the reverse process to recover the proper data. The present invention is not limited to a particular Interleaving process.

The encoder 140 is typically a convolutional encoder, e.g., a trellis encoder for applying FEC. The trellis encoder employs a ⅔ rate (R=⅔) trellis code in accordance to ATSC. Specifically, each 2-bit word is compared to a past history of previous 2-bit words and a 3-bit binary code is generated to describe the transition from the previous 2-bit word to the current one. Namely, the 3-bit codes are substituted for the original 2-bit words and are transmitted as the symbols of the VSB. Again, the trellis code rate is defined by a particular standard, but the present invention is not limited to a particular trellis code rate.

The multiplexer 150 is tasked with inserting the segment sync and field sync. These sync signals are inserted after the randomization and error coding processes so as not to disturb the time and amplitude relationships of these signals.

In turn, the multiplexed signal is then modulated by the present novel VSB modulator 160 to produce a modulated signal. The modulated signal is then up-converted by the RF up-converter 170 to a proper RF frequency for transmission.

Figure 2:
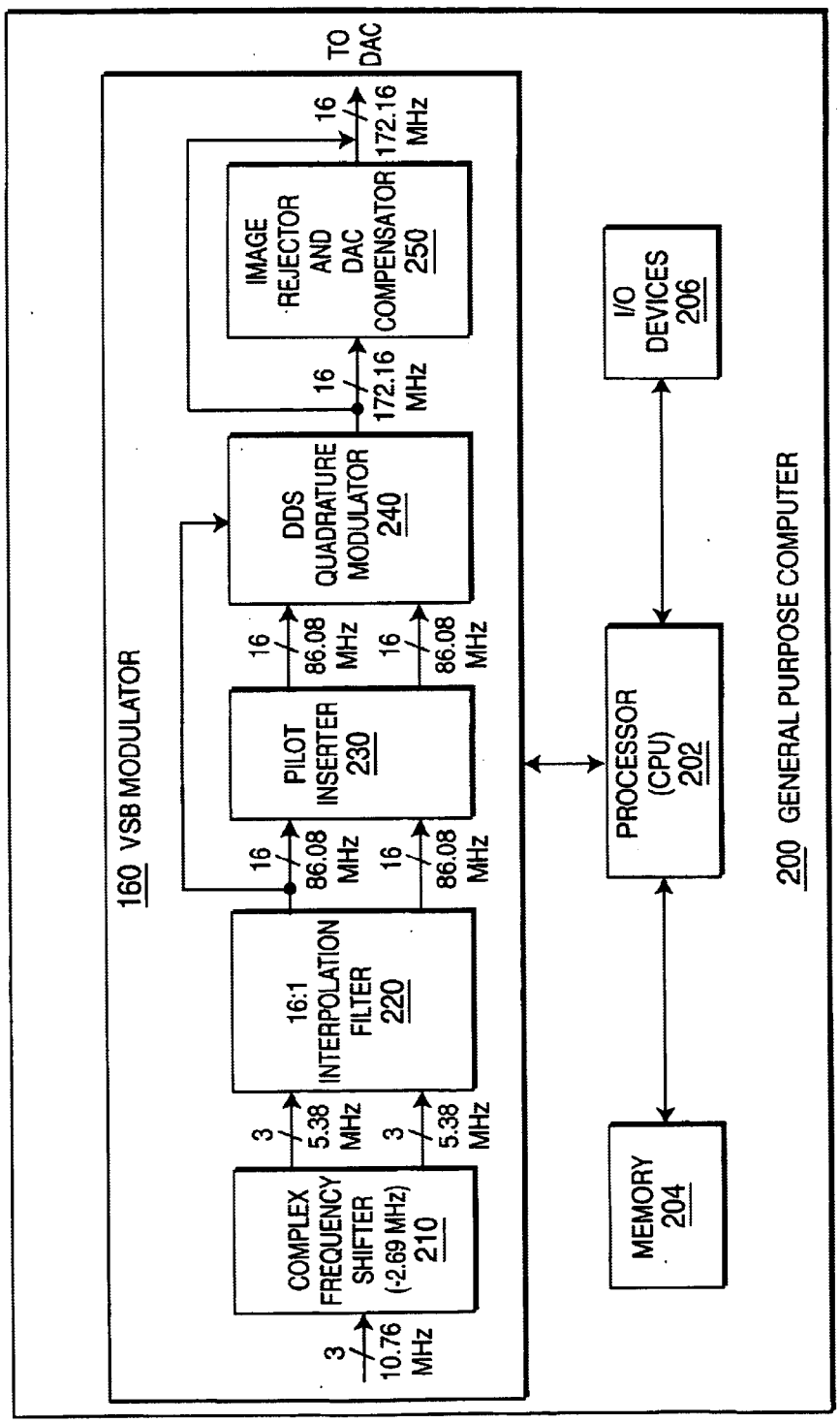
FIG. 2 depicts a block diagram of a digital VSB modulator for direct conversion of baseband digital symbols to IF or RF without the need for analog up conversion.
Figure 3:
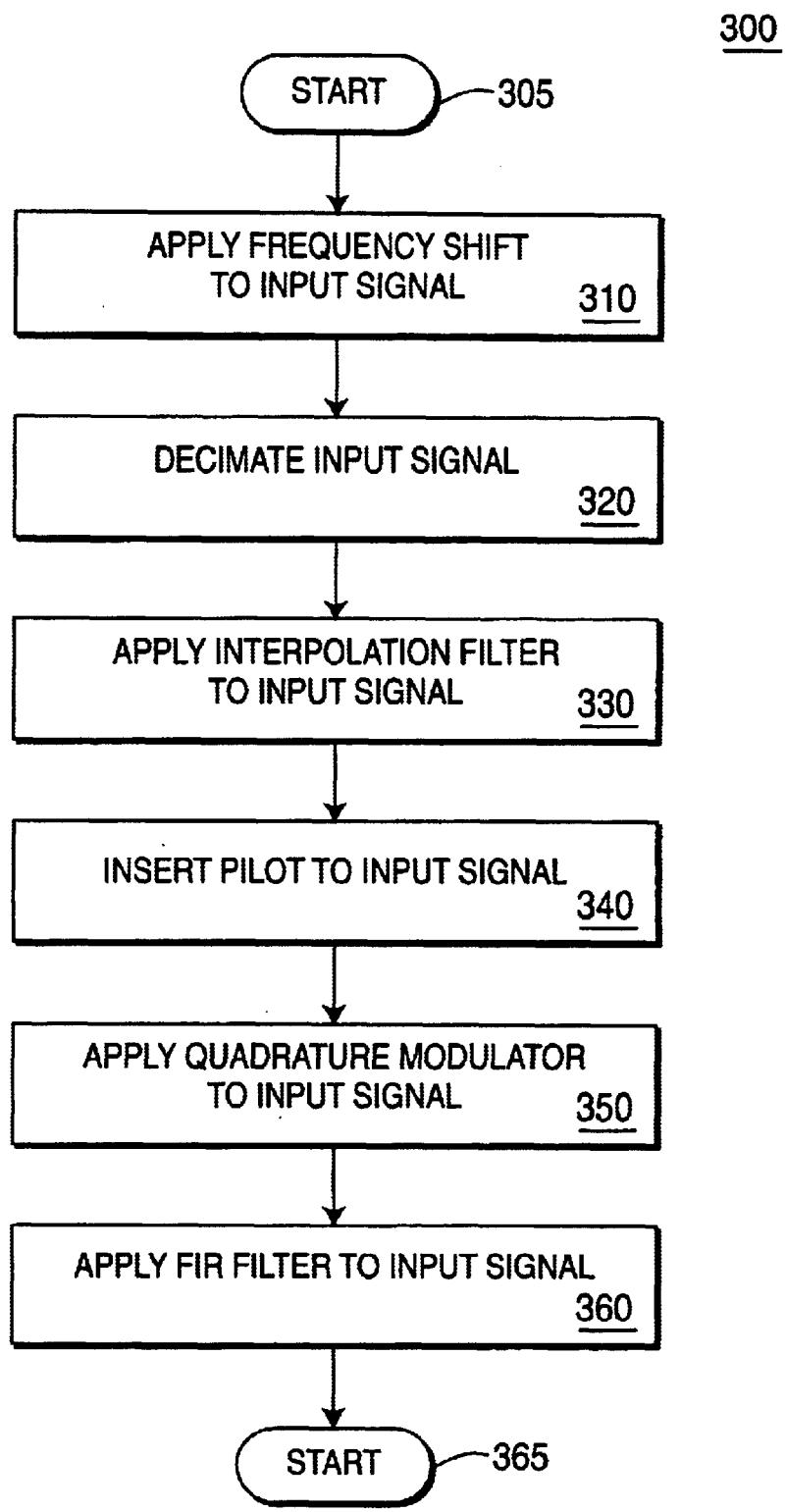
FIG. 3 is a flow diagram of a method for direct conversion of baseband digital symbols to IF or RF without the need for analog up conversion.

FIG. 2 depicts a block diagram of a digital VSB modulator 160 for direct conversion of baseband digital symbols to a desired frequency (e.g., IF or RF) without the need for analog up conversion. FIG. 3 is a flow diagram of a corresponding method 300 for the direct conversion of baseband digital symbols to a desired frequency (e.g., IF or RF) without the need for analog up conversion. The reader will best understand the invention by simultaneously consulting both FIGS. 2 and 3.

The VSB modulator 160 performs modulation and filter shaping on the incoming signal. Specifically, the architecture of the present VSB modulator provides an important advantage of being a low-cost implementation of an all digital VSB modulator that can be employed for HDTV applications including remodulation of digital video to a typical television IF or RF frequency. This architecture can be implemented using digital integrated circuit technologies for direct conversion of baseband digital symbols to IF or RF without the need for analog up conversion.

Specifically, the VSB modulator 160 comprises a complex frequency shifter 210, an interpolation filter 220, a pilot inserter 230, a DDS quadrature modulator 240 and an image rejector and DAC compensator 250. As discussed below, the pilot inserter 230 and the image rejector and DAC compensator 250 can be deemed as optional to the extent that the functions provided by these modules can be omitted and/or performed outside of the present VSB modulator 160.

The input to the complex frequency shifter 210 can be an ATSC bitstream having undergone FEC processing. For example, the inputs to the VSB modulator 160 are 3-bit (8-level) symbols or 4-bit (16-level) symbols produced by a symbol mapper as described by the ATSC specification for digital video transmission. The mapping is typically applied to a digital video bitstream after it has been modified using forward error correction techniques, and the symbols are generated at a 10.76 MHz. rate.

At the input of the VSB modulator 160, the symbols are frequency shifted (step 310 of FIG. 3) to generate a complex signal and then decimated (step 320 of FIG. 3) to provide two half-rate streams. This operation can be performed very inexpensively using simple inverters and a demultiplexer. Namely, the input signal is filter-shaped by being frequency shifted to the "left" by −2.69 MHz. to allow filtering at baseband. The decimation operation splits the input stream (at 10.76 MHz.) into two streams (the I and Q components of a complex signal), each at only 5.38 MHz. This decimation allows further processing to be performed more easily at half the required processing rate. Although the present complex frequency shifter 210 is described as performing two functions: frequency shifting and decimation, it should be understood that these two functions can be implemented within a single module or separate modules.

The frequency-shifted signal is then received by the interpolation filter 220 (step 330 of FIG. 3), where the filter is a polyphase 16:1 interpolation filter having real coefficients. Namely, interpolation filter 220 is a baseband interpolation filter. The polyphase 16:1 interpolation filter effectively generates 16 output symbols for every input symbol. The increased output rate or sampling rate allows for subsequent sampling condition where a multiplication by a high frequency sinusoidal is necessary (e.g., step 350 of FIG. 3). The advantage of performing this sampling rate conversion at this point is because the interpolation filter 220 is relatively inexpensive.

It should be noted that the coefficients of the interpolation filter 220 are specified so that the filter performs a root-raised cosine spectral shaping of the input signal with the rolloff factor set to 0.115 as specified by the ATSC. The bandwidth of this filter is only 2.69 MHz. Because of the decimation performed in the previous block, this filter only needs to operate at 86.08 MHz (16×5.38) rather than at twice the rate. The filter can be implemented using significant resource sharing or canonical signed digital techniques to control the implemented area of the filter. Typical coefficient sizes are on the order of 12–16 bits. The high interpolation ratio is important since the present VSB modulator is designed to perform the modulation process digitally instead of analog, thereby requiring a high sampling rate.

The pilot inserter 230 adds (step 340 of FIG. 3) a complex pilot signal at −2.69 MHz to the output (interpolated signals) of the interpolation filter 220. The pilot signal is a small DC shift that is applied as a helping signal. Namely, after frequency shaping the spectrum, the pilot signal is inserted at the left band edge. This causes a small residual carrier to appear at the zero frequency point of the resulting modulated spectrum, thereby providing the receiver with a easily identifiable point to lock onto that is independent of the data being transmitted.

It should be noted that pilot insertion is typically performed before frequency shaping as disclosed in the ATSC standard. However, by performing pilot insertion after (rather than before) the interpolation filter, the datapath through the interpolation filter is maintained at 3 bits (rather than 16) so that the filter size is reduced. This again is another advantage in reducing the overall cost of the modulator. However, the pilot inserter 230 is optional to the extent that its function can be implemented prior to the VSB modulator as indicated by the ATSC standard. In such situation, a more complex (i.e., a more expensive) interpolation filter 220 is required since the interpolation filter cannot be maintained at 3 bits. Nevertheless, the VSB modulator is still capable of direct conversion of baseband digital symbols to IF or RF without the need for analog up conversion.

After pilot insertion, the data signal (a complex baseband signal) is applied (step 350 of FIG. 3) to a quadrature modulator 240 that makes use of direct digital synthesizers (DDS) operating at 86.08 MHz. Two synthesizers are used to generate two real sinusoids that are 90 degrees out of phase from one another. Each of these sinusoids is multiplied by one of the input streams. Namely, the complex baseband signal to the quadrature modulator 240 needs to be modulated up to some desired intermediate frequency (IF) or RF. The frequency of the sinusoids are typical television IF and RF frequencies, for example 43.75 MHz. (IF), 58 MHz. (Channel 3), or 64 MHz. (Channel 4). It should be noted that 58 MHz., or 64 MHz. are equivalent to typical VCR output frequencies, thereby allowing the present invention to be implemented in a digital VCR. Thus, the complex signals into the DDS quadrature modulator 240 is up-converted into a real signal at a desired frequency (IF or RF) at the output of the DDS quadrature modulator. The desired frequency is selected within the DDS. In essence, sub-sampling (e.g., sampling rate of 86.08 MHz.) is implemented to attain the desired frequency of 43.75 MHz., 58 MHz., 64 MHz. and so on. It should be noted that the desired frequency should be selected in a manner that will not cause the images to overlap the desired frequency spectrum. For example, the sampling rate of 86.08 MHz. is chosen such that the desired frequency of 43.75 MHz., 58 MHz., 64 MHz. can be attained without having distortion caused by overlap of images on the desired frequency spectrum.

However, since the synthesizer rate is only 86.08 MHz., aliases or images of the desired frequencies will appear at the output of the synthesizers and will be compensated by using post processing. Namely, the sampling rate is not twice the desired frequency, thereby failing to satisfy the Nyquist criterion and artifacts may result.

After multiplication, the two streams are multiplexed together to form a 176.16 MHz. output stream which contains the desired digital signal as well as images due to the synthesizer aliases. This stream is then applied to the image rejector and DAC compensator 250, which is tasked with performing image rejection and compensation for spectral rolloff in digital-to-analog converters (step 360 of FIG. 3).

In one embodiment, the image rejector and DAC compensator 250 comprises a real FIR filter or COMB filter for image rejection (or suppression). For image rejection, the filter coefficients will need to be programmable since the images will appear at different frequencies for each of the desired IF or RF outputs.

It should be understood that the image rejector and DAC compensator 250 is an optional module within the VSB modulator 160. Specifically, a SAW filter is typically implemented outside of the VSB modulator (e.g., after the DAC) that is tasked for filtering some of the images. However, if additional image rejection beyond that of the SAW filter is required, then the image rejector and DAC compensator 250 can be implemented to provide additional image rejection. For example, a notch can be implemented using a COMB filter in the image rejector and DAC compensator 250 at the image location to provide further attenuation on the image, thereby assisting subsequent analog filtering and reducing the complexity and cost of analog filtering. Thus, again the present VSB can be implemented to reduce the overall cost of the VSB transmitter.

Additionally, DAC generally generates "zero order hold", where a signal is held until the next sample, thereby generating a stair-case like response. The impact of this zero order hold, looking at the frequency domain, is similar to a low-pass filtering effect at the output of the DAC. Namely, distortion is introduced due to this low-pass roll-off. Thus, to pre-empt or compensate the effect of the DAC, the image rejector and DAC compensator 250 may apply a filter having a high-pass type of response to the oversampled input signal of 172.16 MHz. In sum, the effect of the high pass response caused by the image rejector and DAC compensator 250 when combined with the low-pass filtering effect of the DAC will produce the desired spectrum.

It should be noted that roll-off in the spectrum can generally be addressed by the receiver, thereby making the image rejector and DAC compensator 250 an optional module. However, if the present VSB modulator is implemented at a broadcast transmitter, it may be desirable to implement the image rejector and DAC compensator 250 to produce an output signal that is as clean as possible. Thus, for low performance system, the image rejector and DAC compensator 250 can be optionally omitted to further reduce cost of the VSB modulator.

The output of the VSB modulator can be applied to a DAC (not shown) operating at 172.16 MHz for direct generation of the IF or RF modulated analog signal. A post-processing analog bandpass filter can be applied after the DAC for further rejection of the out-of-band images and quantization noise.

Typically, two stages of up-conversions are necessary, where a baseband signal is first up-converted to an intermediate frequency, and is then up-converted again to a broadcast radio frequency. Thus, a prior art implementation will typically apply a DAC to the baseband signal and then apply a first analog up-conversion to attain the intermediate frequency and then apply a second analog up-conversion to attain the broadcast radio frequency.

In contrast, the present novel direct digital VSB modulator 160 up-converts the baseband signal digitally to the desired frequency, e.g., IF, thereby avoiding one analog up-conversion. The DAC is then applied to the IF signal and then one analog up-conversion is performed to the attain the RF signal for broadcast.

FIG. 2 also depicts one embodiment of the present invention where the VSB modulator 160 is implemented within a general purpose computer. In one embodiment, the general purpose computer 200 comprises a VSB modulator 160, a processor (CPU) 202, a memory 204, e.g., random access memory (RAM), and various input/output devices 206, (e.g., a keyboard, a mouse, an audio recorder, a camera, a camcorder, a video monitor, any number of imaging devices or storage devices, including but not limited to, a tape drive, a floppy drive, a hard disk drive or a compact disk drive).

It should be understood that the VSB modulator 160 can be a physical device that is coupled to the CPU 202 through a communication channel. Alternatively, the VSB modulator 160 can be represented by one or more software applications (or even a combination of software and hardware, e.g., using application specific integrated circuits (ASIC)), where the software is loaded from a storage medium, (e.g., a magnetic or optical drive or diskette) and operated by the CPU in the memory 204 of the computer. As such, the VSB modulator 160 (including associated data structures) of the present invention can be stored on a computer readable medium, e.g., RAM memory, magnetic or optical drive or diskette and the like.

It should be understood that although the above disclosure provides a listing of various frequency values, these values are only approximate values and may vary within a practical application environment. In fact, some of these frequency values may vary significantly due to a particular implementation.

Although various embodiments which incorporate the teachings of the present invention have been shown and described in detail herein, those skilled in the art can readily devise many other varied embodiments that still incorporate these teachings.

What is claimed is:

1. An apparatus for up-converting an input signal to a desired frequency, said apparatus comprising:
   a shifter, for applying a frequency shift to the input signal to produce a shifted input signal and applying decimation to the shifted input signal to generate at least two frequency shifted signals;
   an interpolation filter, coupled to said shifter, for interpolating said at least two frequency shifted signals to produce at least one interpolated signal; and
   a direct digital synthesizers (DDS) modulator, coupled to said interpolation filter, for up-converting said at least one interpolated signal to the desired frequency.

2. The apparatus of claim 1, further comprising:
   a pilot inserter, coupled to said interpolation filter, for inserting a pilot signal onto said at least one interpolated signal.

3. The apparatus of claim 1, further comprising:
   an image rejector and digital-to-analog converter (DAC) compensator, coupled to said direct digital synthesizers (DDS) modulator, for rejecting images and for performing digital-to-analog compensation.

4. The apparatus of claim 1, wherein said frequency shift applied by said shifter is approximately 2.69 MHz.

5. The apparatus of claim 4, wherein said at least two frequency shifted signals are sampled at a frequency of approximately 5.38 MHz.

6. The apparatus of claim 1, wherein said interpolation filter is a 16:1 interpolation filter.

7. The apparatus of claim 6, wherein said at least one interpolated signal is sampled at a frequency of approximately 86.08 MHz.

8. The apparatus of claim 1, wherein said input signal is a baseband signal.

9. A method for up-converting an input signal to a desired frequency, said method comprising the steps of:
   (a) applying a frequency shift to the input signal to produce a shifted input signal and applying decimation to the shifted input signal to generate at least two frequency shifted signals;
   (b) interpolating said at least two frequency shifted signals to produce at least one interpolated signal; and
   (c) applying a direct digital synthesizers (DDS) modulator, to up-convert said at least one interpolated signal to the desired frequency.

10. The method of claim 9, further comprising the step of:
    (b') inserting a pilot signal onto said at least one interpolated signal prior to said applying step (c).

11. The method of claim 9, further comprising the step of:
    (d) rejecting images and performing digital-to-analog compensation on said at least one up-converted signal from step (c).

12. The method of claim 9, wherein said frequency shift is approximately 2.69 MHz.

13. The method of claim 12, wherein said at least two frequency shifted signals are sampled at a frequency of approximately 5.38 MHz.

14. The method of claim 9, wherein said interpolating step (b) applies a 16:1 interpolation filter.

15. The method of claim 14, wherein said at least one interpolated signal is sampled at a frequency of approximately 86.08 MHz.

16. The method of claim 9, wherein said input signal is a baseband signal.

17. A computer-readable medium having stored thereon a plurality of instructions, the plurality of instructions including instructions which, when executed by a processor, cause the processor to perform the steps comprising of:
    (a) applying a frequency shift to the input signal to produce a shifted input signal and applying decimation to the shifted input signal to generate at least two frequency shifted signals;
    (b) interpolating said at least two frequency shifted signals to produce at least one interpolated signal; and
    (c) applying a direct digital synthesizers (DDS) modulator, to up-convert said at least one interpolated signal to the desired frequency.

18. The computer-readable medium of claim 17, further comprising the step of:
    (b') inserting a pilot signal onto said at least one interpolated signal prior to said applying step (c).

19. The computer-readable medium of claim 17, further comprising the step of:
    (d) rejecting images and performing digital-to-analog compensation on said at least one up-converted signal from step (c).

20. A transmitter for transmitting an input signal, said transmitter comprising:
    a data randomizer for randomizing said input signal to generate a randomized input signal;
    a first encoder, coupled to said data randomizer, for applying block coding to said randomized input signal to generate a block coded input signal;
    a data interleaver, coupled to said first encoder, for interleaving said block coded input signal to generate an interleaved input signal;

a second encoder, coupled to said data interleaver, for applying convolutional coding to said interleaved input signal to generate a convolutional coded input signal;

a multiplexer, coupled to said second encoder, for multiplexing said convolutional coded input signal with at least one sync signal to generate a multiplexed input signal;

a modulator, coupled to said multiplexer, said modulator comprising:

a shifter, for applying a frequency shift to the multiplexed input signal to produce a shifted multiplexed input signal and applying decimation to the shifted multiplexed input signal to generate at least two frequency shifted signals;

an interpolation filter, coupled to said shifter, for interpolating said at least two frequency shifted signals to produce at least one interpolated signal; and a direct digital synthesizers (DDS) modulator, coupled to said interpolation filter, for up-converting said at least one interpolated signal to the desired frequency to generate a modulated signal; and a up-converter, coupled to said modulator, for up-converting said modulated signal.

* * * * *

UNITED STATES PATENT AND TRADEMARK OFFICE
CERTIFICATE OF CORRECTION

PATENT NO. : 6,810,090 B1
DATED : October 26, 2004
INVENTOR(S) : Perlow

It is certified that error appears in the above-identified patent and that said Letters Patent is hereby corrected as shown below:

Drawings,
Figure 3, please change "START" in the block labled with reference number 365 to -- END --.

Signed and Sealed this

Twenty-first Day of June, 2005

JON W. DUDAS
*Director of the United States Patent and Trademark Office*